Jan. 29, 1963 H. H. GORRIE ETAL 3,076,097
LOAD CONTROL FOR ELECTRIC POWER SYSTEMS
Filed May 11, 1959 7 Sheets-Sheet 3

INVENTORS
HARVARD H. GORRIE
ANTHONY J. HORNFECK
BY HAROLD H. KOPPEL
JOHN F. LUHRS
ATTORNEY

INVENTORS
HARVARD H. GORRIE
ANTHONY J. HORNFECK
BY HAROLD H. KOPPEL
JOHN F. LUHRS

*John F. Luhrs*
ATTORNEY

INVENTORS
HARVARD H. GORRIE
ANTHONY J. HORNFECK
BY HAROLD H. KOPPEL
JOHN F. LUHRS

ATTORNEY

United States Patent Office 3,076,097
Patented Jan. 29, 1963

3,076,097
LOAD CONTROL FOR ELECTRIC POWER SYSTEMS
Harvard H. Gorrie, Cleveland Heights, Anthony J. Hornfeck and Harold H. Koppel, South Euclid, and John F. Luhrs, Chagrin Falls, Ohio, assignors to Bailey Meter Company, a corporation of Delaware
Filed May 11, 1959, Ser. No. 812,543
28 Claims. (Cl. 290—4)

This invention relates to automatic load control for electric power systems, and more particularly to a load control which distributes the system load between the power producing units in each generating station and between the several generating stations included in the system so that power is produced at lowest cost.

The load control herein described has two main objectives. First, to maintain generation equal to demand or desired generation and second, to generate power at least cost.

The first objective is obtained by establishing a continuous error signal proportional in magnitude to the difference between actual and desired generation and from this error signal generating a Master Control Signal which operates to continuously adjust the loading of the generating units to maintain power production equal to demand.

In accordance with accepted theory the power required to satisfy a given load is produced most efficiently when all units of power are received at the load at the same incremental cost. We achieve this, our second objective, by utilizing the Master Control Signal under steady state conditions as an index of the incremental cost at which each power producing unit should operate and gradually readjusting the loading of each unit until it is operating at this incremental cost.

The Master Control Signal is indicative of the incremental cost at which units of power should be received at the load for maximum economy and, neglecting line losses, the Master Control Signal may be utilized directly in each power station to control the loading of the individual power producing units. Ordinarily, however, the line losses from each station to the load differ from the line losses from any other station to the load. From the Master Control Signal therefore a Modified Master Control Signal for each individual station may be derived which takes into consideration the magnitude of the line losses from such individual station as compared to the line losses from all other power stations in the system. The effect of transmission losses on the incremental cost at which a station should generate power is usually determined from a so-called "Penalty Factor" assigned to the power station and which is derived from computations involving such factors as system power distribution and the like. The Modified Master Control Signal as derived for each power station may be taken as an index of the incremental cost at which units of power in that station should be produced for maximum system economy.

A primary object of our invention is to provide a load control system wherein, generally, each generating unit immediately shares in system load changes in proportion to its maximum capability, but wherein the load distribution among the generating units is then gradually readjusted so that each power producing unit produces power at an assigned incremental cost.

A further object of our invention is to provide a load control system wherein the immediate participation of each power producing unit in a load change may be adjusted in accordance with the characteristics or limitations of that unit; but wherein the ultimate load change of that unit is determined by its incremental cost of production.

It is a further object of our invention to provide a load control system wherein relatively small changes in demand are satisfied practically instantaneously, but wherein large sustained changes in demand are satisfied at a slow or prescheduled rate.

Still another object of our invention is to maintain the power output of each power producing unit within predetermined limits, but to permit the power output to temporarily go beyond such limits to assist in satisfying sudden changes in system load.

A further object of our invention is to provide a control system of maximum flexibility wherein the components may be easily arranged or rearranged in accordance with the characteristics of the particular system to which it is applied.

These and other objects will be apparent from the description to follow and from the drawings, in which.

Figure 4:
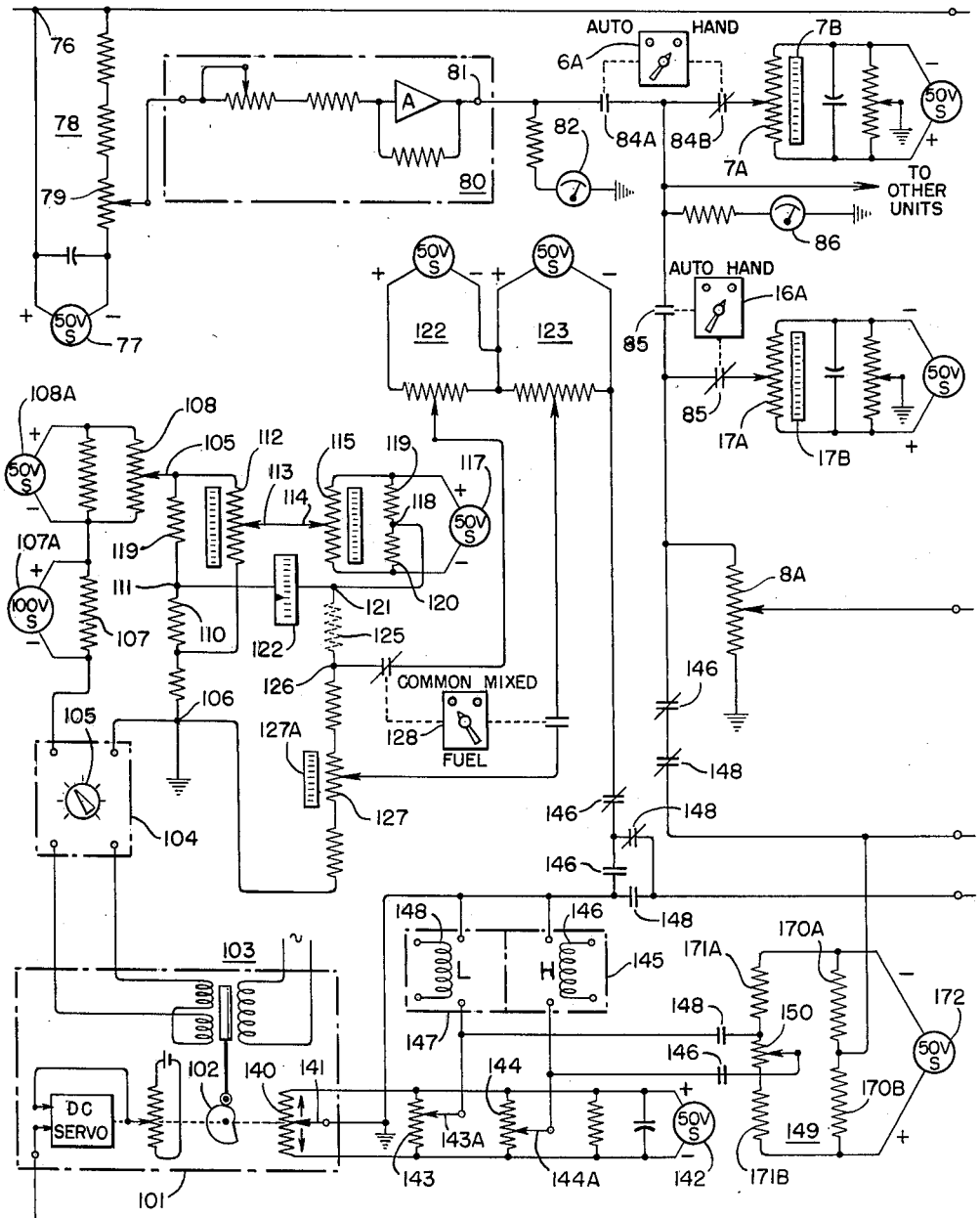
Figure 4A:
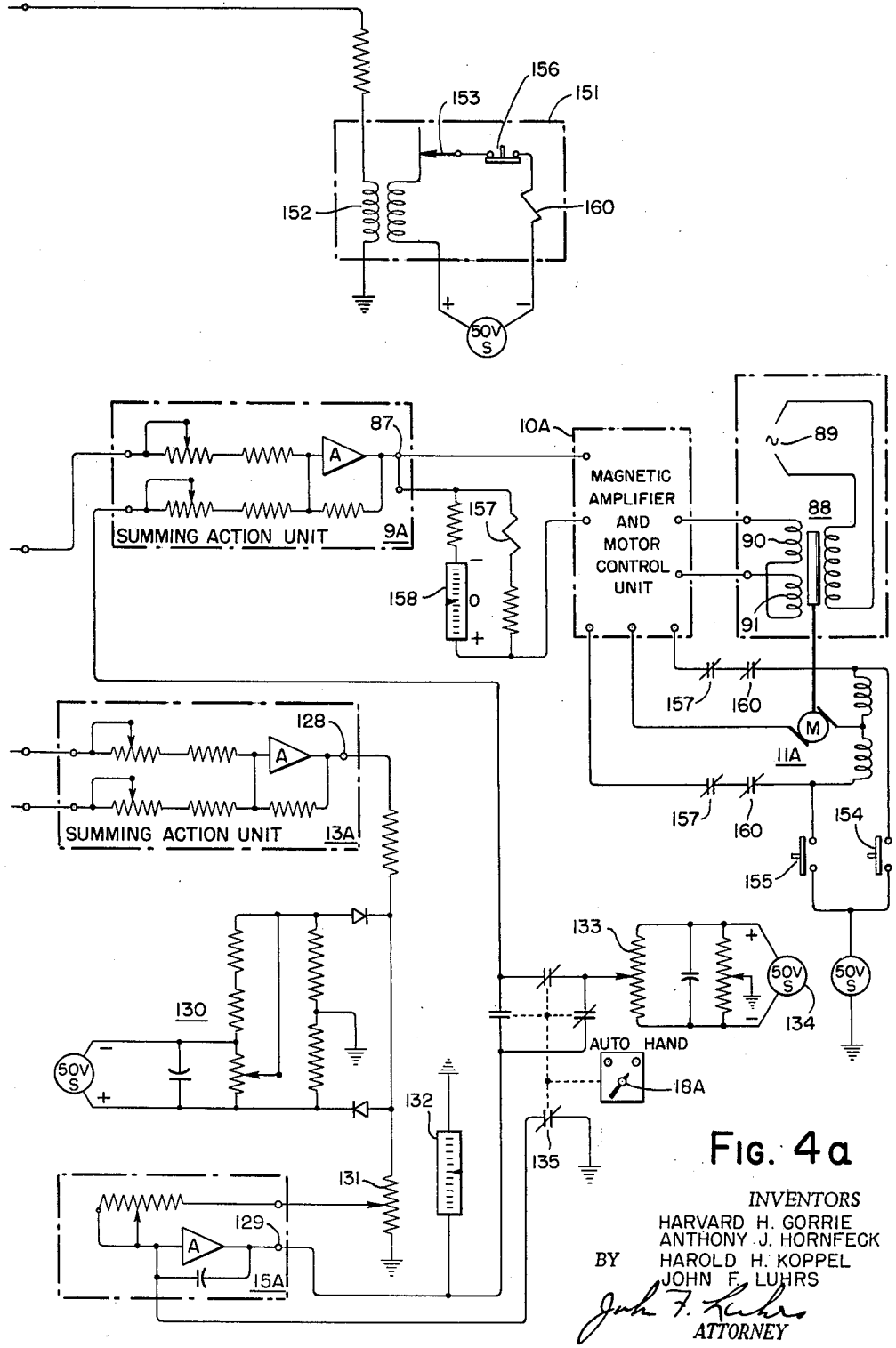

FIGS. 4 and 4a arranged in order from left to right provide an elementary diagram of typical Station and Unit Controllers.

Figure 5:
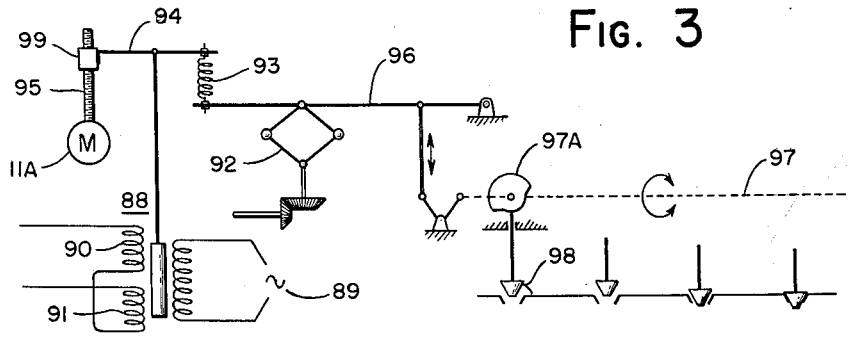

FIG. 5 illustrates schematically the feed back control from synchronizing motor position employed in the embodiment of the invention shown in FIG. 4.

Figure 7:
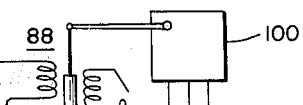
Figure 6:
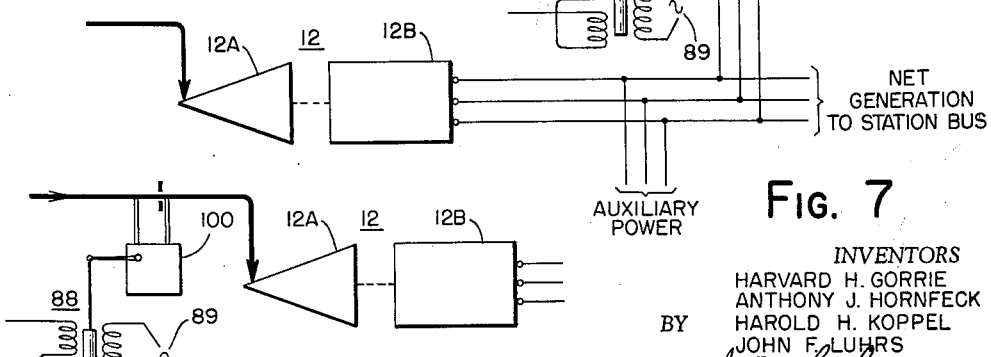

FIGS. 6 and 7 illustrate alternate forms of feedback control which may be used in the embodiment of our invention shown in FIG. 4.

Figure 8:
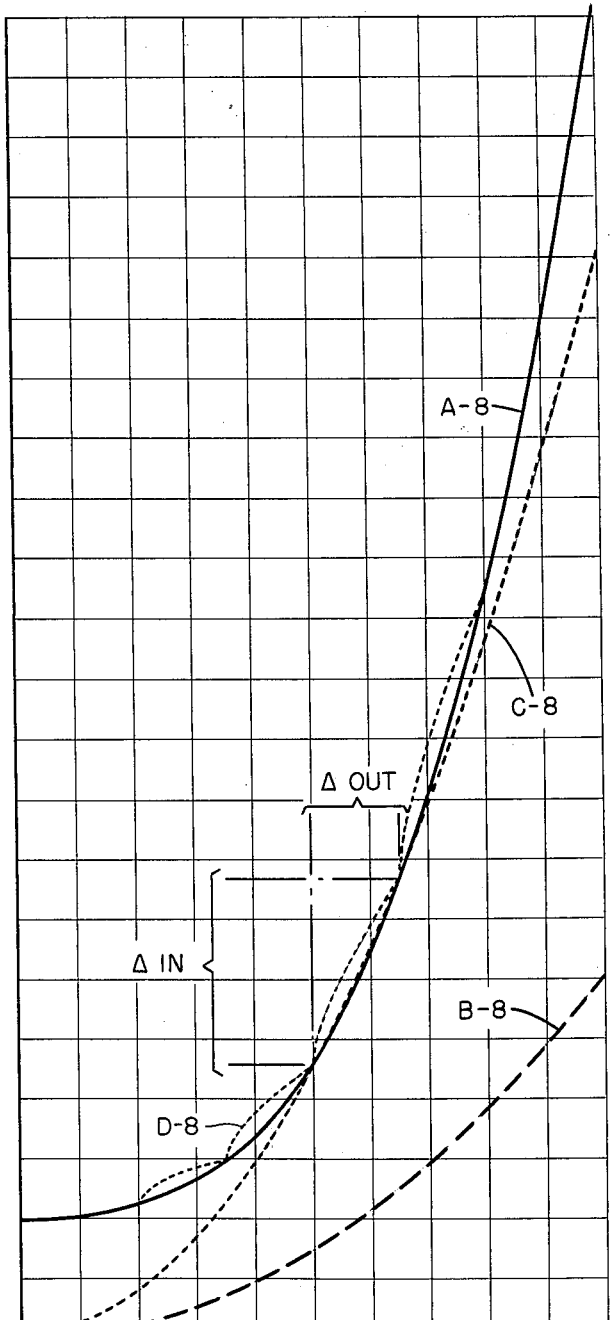

FIG. 8 shows arbitrary curves useful in explaining the derivation of incremental cost.

Figure 9:
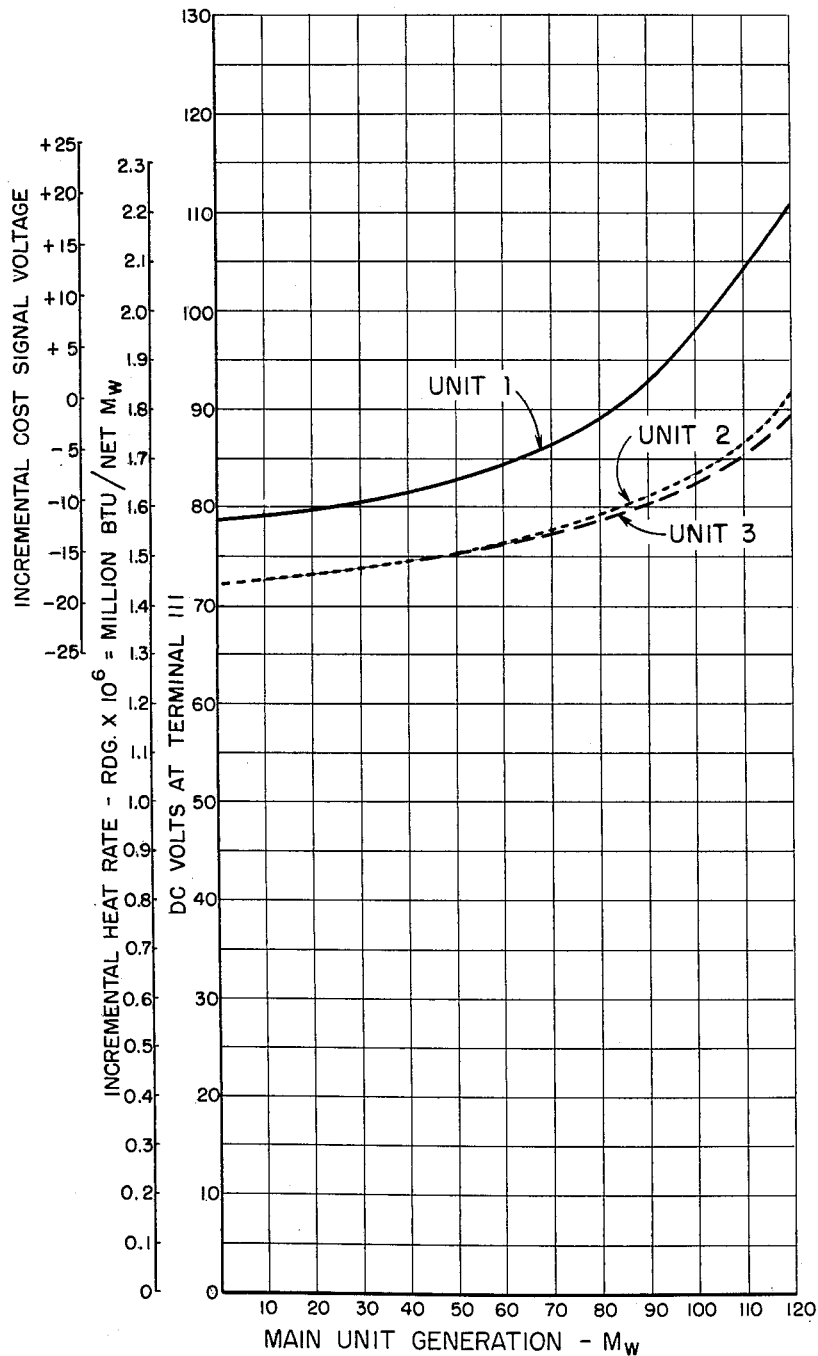

FIG. 9 shows typical incremental rate curves.

Figure 1:
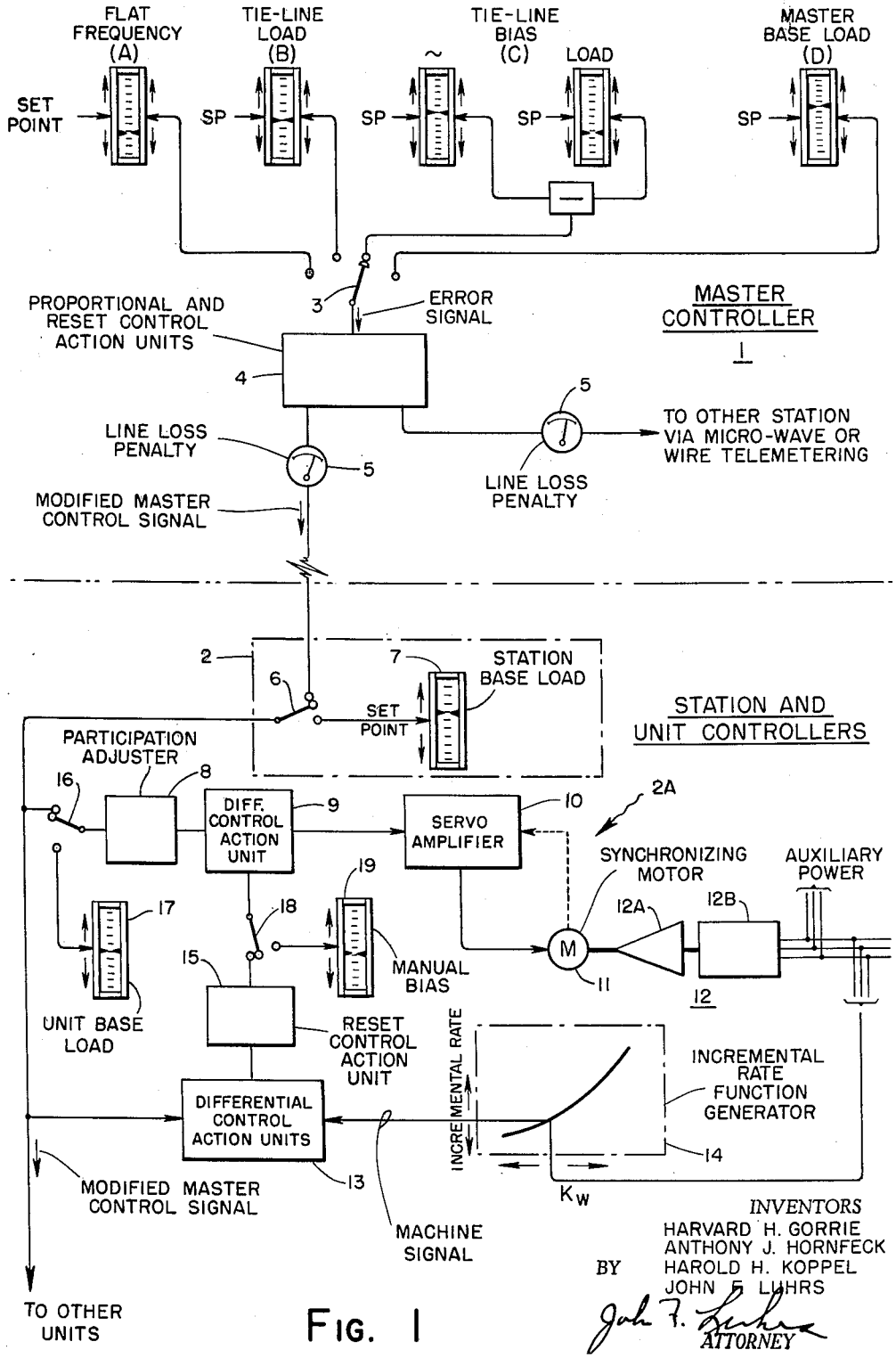
FIG. 1 is a schematic diagram useful in explaining the basic concepts incorporated in our Load Control.

Referring now to FIG. 1 there is shown schematically a Master Controller 1, a Station Controller 2 and a Unit Controller 2A. The Master Controller may be used to control an entire electric power system, or a particular area in a power system, which system or area may include one or more power stations. Each power station is preferably provided with a Station Controller which receives the Master Signal and relays it to the Unit Controllers one of which is provided for each power producing unit in the station. In any power system one or more of the power producing units may comprise a fossil fuel fired steam generator and a prime mover comprising a steam turbine-electric generator. Other power producing units may be hydro-electric prime movers and still others may comprise an atomic reactor and a suitable prime mover associated therewith. To all of the various types of power producing units presently available our invention is equally applicable.

As hereinbefore stated it is the purpose of a Master Controller, such as shown in FIG. 1 to establish an error signal proportional in magnitude to the difference between desired and actual system or area generation and from this error signal generate a Master Control Signal. Various indices of desired system or area generation are commonly employed and in FIG. 1 we have shown four such indices: (A) Flat Frequency, (B) Tie-Line Load, (C) Tie-Line Bias, and (D) Master Base Load. The desired value of an index is established by adjustment of the "Set Point." The error signal is then proportional to the difference between the Set Point value and the metered value of the index.

The control system operates to reduce or maintain the error signal at zero value. When Flat Frequency is used as the index, the loading of all power producing units will be continuously varied to maintain system frequency at an assigned value, which in the United States is ordinarily 60 cycles per second. When Tie-Line Load is used as the index, the loading of the power producing units is varied to maintain Tie-Line Load at a predetermined value or schedule. By Tie-Line Load is ordinarily meant the total energy leaving or entering the system or area under control by means of one or more Tie-Lines to other systems or areas. When the Tie-Line Bias is used as an index, the loading of the power producing units under control is varied to maintain a Tie-Line Load which is biased from system frequency. Thus the control while not operating to maintain frequency exactly, assists in maintaining system frequency. When Base Load is used as an index the power producing units are loaded to maintain a preset total output.

Which particular index is used may vary from system to system or from time to time in the same system or area. The particular index used is usually decided upon by the System Dispatcher. We show the Master Controller 1 provided with a selector switch 3 by which any one index may be selected. From the error signal a Master Control Signal is generated by means of suitable control action units 4. Such units are usually arranged to provide proportional and reset actions, however, as will be appreciated by those skilled in the art, such units may be provided with other or additional actions if required for system stability such as rate, lead, lag, etc.

The Master Control Signal is transmitted to each power station in the system or area under control. Such transmission may be by any one of several well known methods such as wire or wireless telemetering. Before transmission the control signal to each station may be modified in accordance with the Line Loss penalty determined for that station as diagrammatically illustrated at 5.

The Master Control Signal either directly or as modified to include line losses is transmitted to each station. Each station is preferably provided with a station selector 6 so that either the Master Control Signal or a manually adjustable "Station Base Load" signal generated by device 7 may be used as a "Station Control Signal" to control the rate of generation of the power producing units in the station. The Station Control Signal serves two purposes. First, to cause each unit to immediately respond to changes in demand and second, to cause the gradual reapportioning of the load among the several units under control so that all operate at an assigned incremental cost. Accordingly, as shown, the Station Control Signal is introduced into each Unit Control through two paths, one of which is arranged to produce the immediate, and the other the gradual readjustment response.

To provide the immediate response the Station Control Signal is transmitted directly through Participation Adjuster 8 and algebraic summing Control Action Unit 9 to servo-amplifier 10 so that changes in magnitude of this signal cause immediate and proportionate changes in the position of a synchronizing motor 11 to reflect corresponding changes in the electrical output of the prime mover 12 comprising a turbine 12A and a generator 12B.

To provide the gradual readjustment of each power producing unit the Station Control Signal is introduced into an algebraic summing Control Action Unit 13 where it is compared to a Machine Signal corresponding to the incremental cost at which power is actually being produced. This Machine Signal is generated by means of a function generator 14 responsive to some measure of net generator output which may be a direct measurement, as shown, or cam shaft position of the turbine 12A, or the like. The algebraic summing Control Action Unit 13 produces an error signal which is introduced into a reset Control Action Unit 15 and the control signal so generated serves to gradually readjust the output of generator 12B until the error signal is reduced to zero. The Participation Adjuster 8 provides a manual means for adjusting the ratio between changes in the Station Control Signal and changes in the signal introduced into the Servo-Amplifier 10. As well understood by those skilled in the art some power producing units can accept relatively greater immediate changes in load than others. Thermal stresses, occasioned by such changes, in the prime mover or steam generator, are one such limitation which determines the magnitude of the load change which may be instantaneously accepted.

A selector switch 16 provides a means for transferring the power producing unit to base load. When operated to the other position than the one shown a manually adjustable signal generated by device 17 is substituted for the Station Control Signal. A selector switch 18 similarly provides a mean for substituting a manually adjustable bias signal, generated by the device 19, for the signal generated in the reset Control Action Unit 15. Under such a substitution there will be no economic readjustment of machine output but the power producing unit will respond only to changes in the Station Control Signal or the Unit Base Load signal whichever is selected. However, the output of the power producing unit may be biased up or down through adjustment of the device 19.

Figure 2:
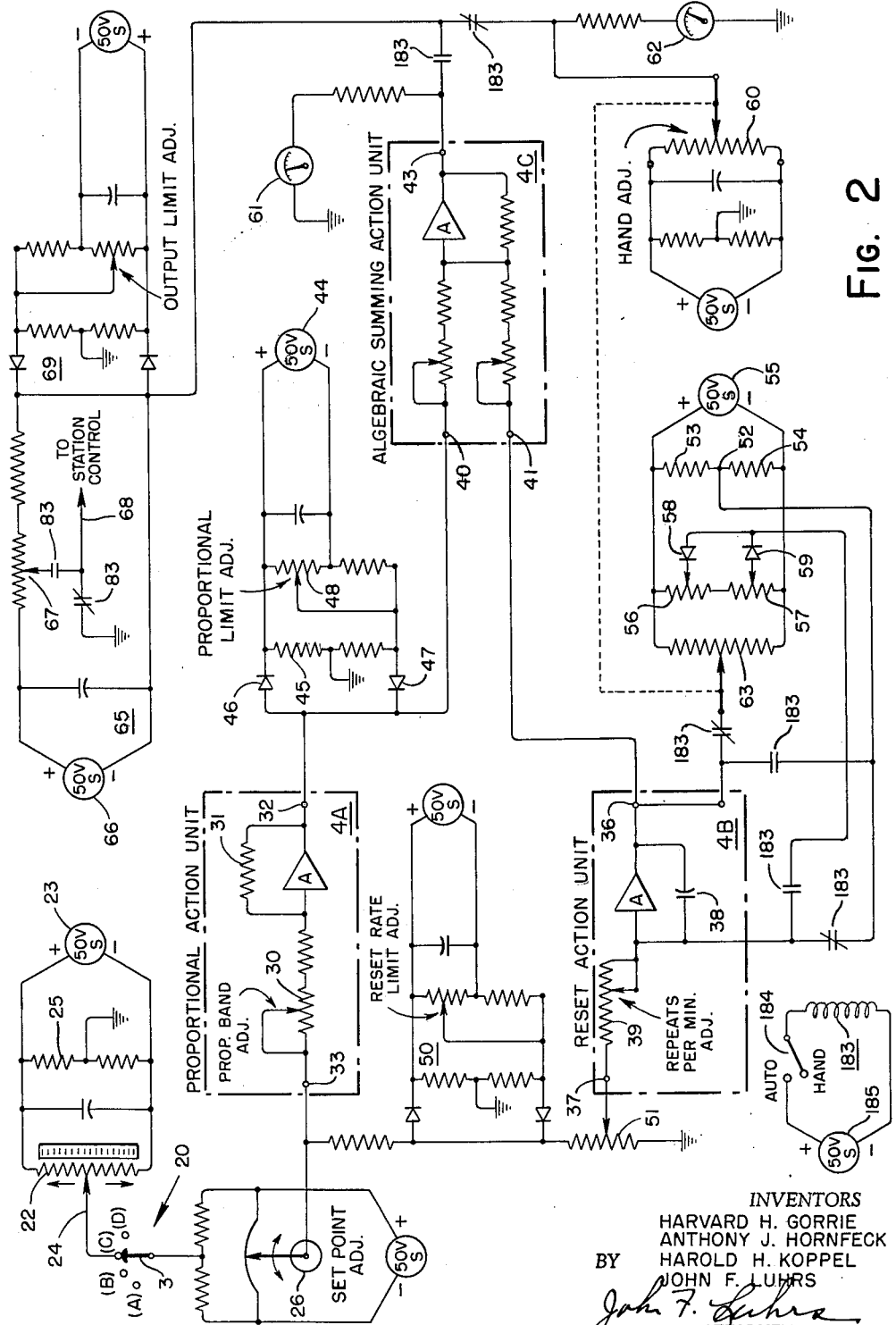
FIG. 2 is an elementary diagram of a typical Master Controller.

Referring now to FIG. 2 there is shown in elementary form a Master Controller embodying the features discussed with reference to the Master Controller 1 of FIG. 1. The Master Controller we have illustrated in FIG. 2 is arranged so that the Set Point may be adjusted and the control may be transferred from "Auto" to "Hand." By "Auto" we mean control wherein the Master Control Signal is automatically generated from an error signal and by "Hand" we mean control wherein the Master Control Signal is manually generated, as for example, through adjustment of a suitable potentiometer. The instrumentalities for adjustment of the Set Point, transfer of the control from Auto to Hand or vice versa as well as the generation of the Hand Master Control Signal may be incorporated in a Selector Station such as illustrated and described in copending application by Hornfeck et al. Serial No. 805,019 filed in the United States Patent Office on April 8, 1959. The required instrumentalities are, however, shown in FIG. 2 in diagrammatic form and will be briefly described as the description proceeds.

A solenoid switch 183 energized by a suitable source 185 and operated by switch 184 is provided for performing the basic transfer operation from Auto to Hand or vice versa. As shown the solenoid of switch 183 must be energized to place the control in Auto. In keeping with convention, however, switch 184 has been shown in the open position and the contacts of switch 183 in the position occupied with the solenoid 183 deenergized. The control will first be described on the assumption that the switch 184 is closed and the control in Auto.

Generally indicated at 20 we show a typical arrangement for producing an error signal proportional to the difference between the Set Point value of the selected index and the actual value thereof. For purposes of illustration we have shown the selected index as being Tie-Line Load. Any other index may be employed, however, by operation of selector switch 3 as explained with reference to FIG. 1. A D.-C. voltage of selected range, for example −25 to +25 volts, is impressed across a slide-wire 22 by means of a suitable source 23 and center grounded resistance network 25. A contact 24 is positioned relative to slidewire 22 in accordance with the actual magnitude of the selected index. The position of the contact 24 is thus a measure of the selected index and the voltage thereof will vary over the range of −25 to +25 volts. The arrangements shown should be taken as merely illustrative of one of many forms of apparatus which may be employed to produce a signal varying in accordance with the magnitude of a measured variable. Likewise, the particular voltage range has been selected for illustrative purposes and for the reason that it is a practical range; however, our invention is nowise limited to a particular selection of voltage range or to the particular arrangement employed to obtain a voltage proportional to the magnitude of the selected index.

The voltage signal of contact 24 has algebraically added to it a Set Point voltage produced by a set point adjuster 26 to produce an error signal which is transmitted to Control Action Units 4A and 4B. These Control Action Units and others, later to be described, incorporated in our control system may be of the type illustrated and described in the previously mentioned application to Hornfeck et al.

Essentially each Control Action Unit consists of an operational amplifier A provided with external input and feedback impedances. The particular kind and arrangement of impedances employed depends upon the control action desired. Thus the control action unit 4A commonly termed "Proportional Action Unit" is provided with an input impedance comprising an adjustable resistance 30 and a feedback impedance comprising a resistance 31 and generates an output signal at terminal 32 proportional in magnitude to the input signal at terminal 33, but of reverse polarity. The ratio between the input signal and output signal can be varied by adjustment of resistor 30.

The Control Action Unit 4B, commonly termed a "Reset Action Unit" generates an output signal at terminal 36 proportional to the time integral of the error signal introduced at input terminal 37. This integrating action is obtained by means of a feedback condenser 38. The "repeats per minute" that is, the number of times per minute the input signal is multiplied in the output signal may be varied by adjustment of a resistor 39.

The output signals at terminals 32 and 36 are transmitted to input terminals 40 and 41 of a Control Action Unit 4C which generates at terminal 43 an output signal proportional to the algebraic sum of the input signal. The output signal at 43 is the Master Control Signal discussed with reference to FIG. 1. The magnitude thereof, having a normal range of −25 to +25 volts D.-C. may be exhibited by a suitable indicator 61 which may be graduated to read directly in terms of volts, system incremental cost ($\lambda_M$) or other units as desired. The Master Control Signal at output terminal 43 will, under the operation so far described, change immediately and in proportion to changes in the error signal and also continuously vary at a rate proportional to the magnitude of the error signal and in sense to cause the error signal to be reduced to zero, that is, to restore the control index to the Set Point.

As so far described the proportional Control Action Unit 4A operates to produce immediate changes in the Master Control Signal at 32 proportional to changes in the error signal and in sense dependent upon the direction of change of the error signal. In the event of a rapid and large change in the error signal, a corresponding rapid change will occur in the output signal at 43 which will be immediately transmitted to the power stations under control. Such a rapid change may cause greater and more rapid changes in load than can be safely accepted by the power stations, the power producing units or the system transmission network. To prevent such large and rapid changes in the Master Control Signal we provide a limiting circuit which prevents the input signal at 40 going above or below predetermined values and thus limits the Master Control Signal at 43 proportionately.

We accomplish this limiting action by means of a circuit comprising a source 44 and center grounded resistor 45. A diode 46 is arranged to conduct whenever the signal at 32 exceeds the positive potential established by the circuit and a diode 47 is arranged to conduct whenever the signal at 32 decreases below the negative potential established by the circuit. The potentials with respect to ground established by the circuit may be adjusted by means of a potentiometer 48 and hence the signal at 40 may be maintained within any desired limits.

A similar circuit as generally indicated at 50 is provided to limit the magnitude of the error signal received by the reset Control Action Unit 4B, thus limiting the rate of change of signal which may be received at the input terminal 41 of the Control Action Unit 4C. Such limiting action is usually desirable to prevent continuous rapid changes in the output of the power producing units during the existence of a sustained error signal of relatively large magnitude. The rate of change in the output signal of Control Action Unit 4B may be further attenuated by means of grounded potentiometer 51.

During Auto operation, unless suppressed, the output signal generated by the reset Control Action Unit 4B will be proportional to the time integral of the error voltage and under a sustained error signal may regenerate up to a high value in the order of ±70 volts or until the amplifier A is saturated. To prevent this, a limiting circuit may be provided as will now be described. Under Auto operation the output voltage of reset Control Action Unit 4B is transmitted to terminal 52 joining resistances 53 and 54 connected in series across a source 55. Also connected across the source 55 are potentiometers 56 and 57. The adjustable contacts of these potentiometers are connected to diodes 58 and 59 respectively. It is apparent that the voltage across condenser 38 will be limited in one direction by adjustment of potentiometer 56 and in the opposite direction by adjustment of potentiometer 57. Thus, during Auto operation the output voltage of the reset action unit 4B may be limited as desired.

Transfer from Auto to Hand operation is accomplished as hereinbefore described by moving switch 184 to the open position deenergizing solenoid 183 whereby the voltage generated by a potentiometer 60 is substituted for that generated by the Control Action Unit 4C. Just prior to the instant of transfer the potentiometer 60 is preferably adjusted so that the output voltage generated thereby is made equal to the output voltage of Control Action Unit 4C. Indicators 61 and 62 are provided, the readings of which may be compared to facilitate such adjustment. Conversely just prior to the instant of transfer from Hand to Auto the voltage generated by the Control Action Unit 4C is preferably made equal to the voltage generated by the potentiometer 60. This is accomplished by adjusting the voltage impressed across the condenser 38. As shown, a potentiometer 63 is provided energized by the source 55. During Hand operation one side of the condenser 38 is connected to the potentiometer 63 and the other side to the terminal 52. Through adjustment of the potentiometer 63 the output of Control Action Unit 4B may be varied as required to make the control signal at 43 equal to the control signal generated by potentiometer 60.

As the control signal at 43 is equal to the signal at 36 when the error signal is zero, and normally this condition obtains when transfer is made from Hand to Auto the contacts of potentiometers 60 and 63 may be ganged as shown by dashed line for simultaneous movement. With such an arrangement the signal at 43 is automatically maintained equal to the signal generated by potentiometer 60 so that instantaneous transfer from Hand to Auto may be made and the otherwise separate adjustment of potentiometer 63 eliminated.

The Master Control Signal, used for illustrative purposes in FIG. 2, has a normal range of −25 to +25 volts D.-C. A signal transmitted over long distances by wired or wireless telemetering is preferably maintained on one side of ground potential. Protective features are then readily incorporated in the system as signal failure may be detected at each signal receiving power station by monitoring the signal voltage with respect to ground. Furthermore, protective circuitry may be readily incorporated in the Master Controller which upon failure of any component thereof will simulate a signal failure by causing the transmitted signal to go to ground potential. Thus in FIG. 2 we show contacts 83 which may be actuated by a normally deenergized solenoid (not shown) incorporated in suitable circuitry (not shown) which upon failure of any component will cause the solenoid to be deenergized causing the transmitted signal to go to ground potential and simulating a signal failure.

A circuit generally indicated at 65 boosts the Master Control Signal range to +10 to +60 volts. The circuit consists essentially of a source of potential 66 in series with the signal generated at 43 and a voltage dividing resistor network including a trim potentiometer 67 whereby the output signal may be accurately adjusted to have a +35 volt bias with respect to the signal at 43. The signal at 67 is carried by a conductor 68 to suitable equipment (not shown) for telemetering the signal to the several power stations under control.

A limiting circuit generally indicated at 69 and similar to those previously described is incorporated to maintain the transmitted Master Control Signal within the selected range of +10 to +60 volts under all conditions of operation save when protective relay 83 is actuated.

Figure 3:
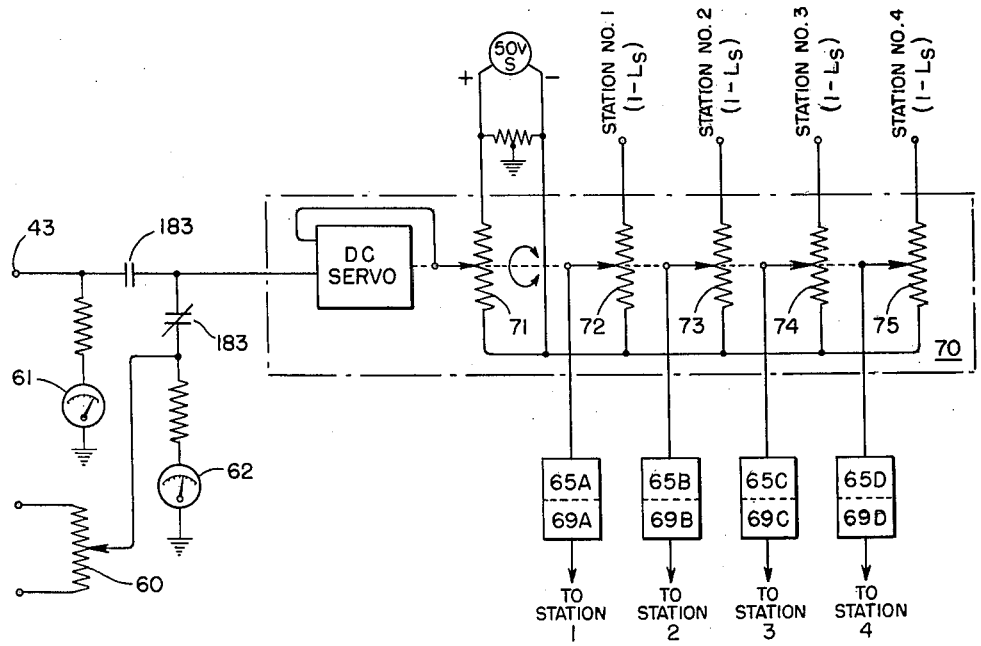
FIG. 3 is a schematic drawing of a modification which may be introduced into the Master Controller shown in FIG. 2.

The arrangement so far described in FIG. 2 is suitable for those power systems wherein transmission losses may be or are neglected and the Master Control Signal is transmitted directly to the power stations. In FIG. 3 we show in diagrammatic form a function generator 70 and circuitry which may be incorporated in the Master Controller shown in FIG. 2 for modifying the Master Control signal transmitted to each power station in accordance with the penalty which should be assessed against that station for transmission losses. In a given system or area the Station Control Signal if it is to be used for economic loading of the power producing units should be:

$$\lambda_S = \lambda_M (1 - L_S) \quad (1)$$

Where:

$\lambda_S$ = Station Incremental Cost
$\lambda_M$ = System Incremental Cost
$L_S$ = Incremental Transmission Losses Associated with the Station The function generator 70 we show in FIG. 3 may be of the type illustrated and described in copending application to H. H. Gorrie, Serial No. 653,427 filed in the United States Patent Office on April 17, 1957 now Patent No. 2,935,670. The Master Control Signal generated at 43 in place of being transmitted directly to the power stations positions a servo-motor driving ganged potentiometers 71, 72, 73, 74 and 75. A constant reference voltage is applied across potentiometer 71 which provides a feedback potential for the servo-motor so that the angular position it assumes is proportional to the Master Control Signal.

An input voltage proportional to the quantity $(1-L_S)$ for each power station is impressed across one of the potentiometers 72, 73, 74 and 75 and accordingly the function generator will perform the mathematical operation $\lambda_M(1-L_S)$. A Station Control Signal unique for each station is thus generated and may be transmitted thereto as explained with reference to FIG. 2. That is to say the —25 to +25 volt signal for each power station generated by function generator 70 may be boosted to the range of +10 to +60 volts by circuitry shown in block form as 65A, 65B, 65C and 65D. Likewise the transmitted signal may be maintained within that range, except when relays similar to the relay 83 are actuated, by limiting circuits such as shown in block form as 69A, 69B, 69C and 69D.

Referring now to FIGS. 4 and 4a there is shown in elementary form a Station Unit Controller embodying the features discussed with reference to FIG. 1. Ordinarily each station is provided with a Station Controller and each power generating unit in each station with a Unit Controller.

The Station Control Signal is received through suitable equipment (not shown) and appears at terminal 76 as a D.-C. voltage having a range of +10 to +60 volts. The signal is first put through a negative booster unit 78 which includes a source 77 and a trim potentiometer 79 for accurately reducing the magnitude of the Station Control Signal by 35 volts and thus restores it to a range of —25 to +25 volts D.-C.

The Station Control Signal is then transmitted to a Buffer control action unit 80 which serves to both isolate the station and unit controllers from the signal receiving equipment and as a means to accurately reestablish the control range of —25 to +25 volts at output terminal 81, that is it corrects for any signal attenuation which might have occurred between the Master Controller and the station. Indicator 82 may be provided to measure the Station Control Signal and may be graduated in terms of volts, Station Incremental Cost ($\lambda_S$) or other units as desired.

A Station Selector 6A is provided so that either the Station Control Signal generated at 81 or a Station Base Load Control Signal generated by manually adjustable potentiometer 7A may be used to control the rate of generation of the power producing units in the station. When Selector Switch 6A is in the Auto position switch 84A is closed and when in the Hand position, as shown, switch 84B is closed. The potentiometer 7A may be provided with a scale 7B, preferably graduated in the same units as indicator 82 to facilitate transfer of the station control from Hand to Auto or vice versa. That is, to bring the potential graduated by potentiometer 7A equal to the potential at 81.

The Station Control Signal as generated either by control action unit 80 or potentiometer 7A is transmitted to all of the power producing units in the station. We show in FIGS. 4 and 4a a single Unit Controller, it being understood that a similar controller would be provided for each power producing unit under control. A Unit Selector 16A is provided so that either the Station Control Signal or a Control Signal generated by manually adjustable potentiometer 17A may be used to establish the Unit Control Signal. When the selector 16A is in the "Auto" position the Station Control Signal determines the loading of the unit. When the selector 16A is in the "Hand" position as shown, a signal generated by a manually adjusted potentiometer 17A determines the loading of the unit. An indicator 86 is provided as well as a scale 17B to facilitate transfer from one mode of control to the other.

The Unit Controller is provided with a participation adjustor comprising a potentiometer 8A. As explained with reference to FIG. 1 the participation adjustor provides a means for adjusting the ratio between changes in the Unit Control Signal and immediate response of the power producing unit. The magnitude of rapid or instantaneous load changes which can be safely accepted varies between power producing units and the participation adjustor 8A provides a means for adjusting the relative immediate participation of the power producing units to load changes. As will be later apparent, our control operates so that ultimately each unit will share in a load change in accordance with its incremental cost as compared to the incremental cost of other units under control. Obviously, if all power producing units under control have similar characteristics the participation adjuster 8A may be set so that the immediate response of each unit to a change in load will be the same, that is, in proportion to the max. capacity or capability of the power producing unit.

The Unit Control Signal is transmitted to an algebraic summing Control Action unit 9A, and the output signal thereof, appearing at terminal 87 is transmitted to a magnetic amplifier and motor control unit 10A which controls the positioning of the governor or synchronizing motor 11A for a turbine such as shown at 12A in FIG. 1. A feedback signal of governor motor position is transmitted to the magnetic amplifier 10A so that the position of the governor motor will at all times be proportional to the magnitude of the control signal at terminal 87.

The particular form of magnetic amplifier and motor control circuit employed will depend upon the characteristics of the governor motor, type of circuitry employed etc. Likewise the arrangement for producing a negative feedback signal is susceptible to wide variation. For purposes of illustration, however, we show the feedback signal as produced by a movable core transformer generally indicated at 88, which is energized by a suitable stabilized source of A.-C. current 89. The magnetic amplifier and motor control unit 10A includes a demodulator for the A.-C. signal produced in the secondaries 90 and 91 to produce a D.-C. feedback signal having a total range of approximately 50 volts. The operation of the magnetic amplifier and motor control unit is such as to cause operation of the synchronizing motor 11A until the negative feedback signal is equal to the control signal at terminal 87.

In FIG. 5 we show diagrammatically a mechanical arrangement which may be employed to position the movable core of transformer 88 in accordance with synchronizing or governor motor position. A turbine speed governor 92 is loaded by a spring 93 through the agency of an arm 94 and nut 99 arranged to travel a screw 95 rotated by the synchronizing motor 11A. A linkage 96 is arranged to cause angular positioning (through a suitable servo-motor, not shown) of a cam shaft 97 carrying a plurality of cams 97A for positioning the spring loaded steam admission valves 98. In FIG. 5 there are four admission valves shown. The first two valves (reading from left to right) are shown in wide open position. The third valve in partially open position and the fourth valve in closed position. The movable core of transformer 88 is carried by arm 94. It is apparent that a movement of motor 11A, in one direction or the other, will tend to load or unload the spring 93 and cause a positioning of the linkage 96 to produce sequential opening or closing of the steam admission valves 98. Simultaneously the movable core of transformer 88 is positioned relative to the secondaries 90 and 91 to produce a signal which is representative of synchronizing motor position.

In FIG. 6 we show an alternate arrangement for providing a negative feedback signal wherein the movable core of transformer 88 is positioned by a flow meter 100 in accordance with the throttle flow to turbine 12A rather than synchronizing motor position. Because of the characteristics of turbine admission valves such as shown at 98 in FIG. 5, direct proportionality does not exist between synchronizing motor position and throttle flow; but throttle flow increases in a series of more or less pronounced loops with respect to synchronizing motor position. Additionally because of lost motion in the linkage between the synchronizing motor and admission valves, backlash in gears etc. which may be particularly pronounced when a reverse in position is called for, an appreciable deadband may exist between change in synchronizing motor position and prime mover output.

The inequality and lack of prime mover response to changes in control signal resulting from these characteristics are sometimes sufficient to materially affect the operation of the control. As prime mover output is substantially a straight line function of throttle flow and no appreciable lag exists between changes in throttle flow and changes in output, the arrangement shown in FIG. 6 may be used to eliminate these difficulties.

In FIG. 7 we show a further modification wherein the movable core transformer 88 is positioned by a direct measurement of prime mover output. Therein we show schematically the power output of prime mover 12 measured by a thermal converter unit 100 arranged to position either directly or through a function generator as shown at 101 in FIG. 4 the core of transformer 88.

The control so far described operates to immediately adjust the output of all prime movers to satisfy changes in system demand. In accordance with our invention, as hereinbefore stated, the relative loading of all units is continuously readjusted so that each prime mover produces power at an assigned incremental cost. We utilize the Unit Control Signal as an index of the assigned incremental cost of the power producing unit. A similar signal is generated proportional to actual or machine incremental cost. These two signals are compared and the output of the prime mover adjusted until zero difference exists between them or in other words until the actual incremental cost of producing power is the same as the assigned incremental cost.

Incremental cost may be defined as the rate of change of input in terms of cost with respect to output. It is equal to the rate of change of input in terms of units of fuel with respect to output multiplied by the unit fuel cost. Fuel units may be in B.t.u., tons, barrels, cubic feet or other units of measurement. In FIG. 8 we show an arbitrary input-output curve A–8 which for illustrative purposes and ease in mathematical manipulation has been drawn to conform to the 3rd degree equation:

$$F = a + bx + x^3 \qquad (2)$$

Where:

$F$=fuel input in B.t.u.
$a$=no load fuel input
$b$=a constant
$x$=net $M_W$ output The rate of change of input with respect to output which for convenience we term, "Incremental Heat Rate" as shown by Curve B–8 will be:

$$\frac{dF}{dx} = b + 3x^2 \qquad (3)$$

and rate of change of input expressed in terms of cost, which for convenience we term, "Incremental Cost," will be, as shown by Curve C–8:

$$C\frac{dF}{dx} = C(b + 3x^2) \qquad (4)$$

Where:

$C$=fuel cost per B.t.u.

Ordinarily the relationship between input and output is non-linear and may only be expressed by a mathematical equation of more or less complexity. In other words, the 3rd degree equation we have used as expressing the relationship may be said to be a simplification we have made for illustrative purposes only. Practically, the input-output relationship is ordinarily determined by tests and the derivative thereof by graphical methods, that is, determining the slope of the input-output curve by plotting $\Delta F / \Delta M_W$ where $\Delta M_W$ is a relatively small increment of output. More specifically, because of the valve loops as discussed with reference to the admission valves 98 shown in FIG. 5, the relationship between fuel input and $M_W$ output is not a smooth curve but approaches more nearly that shown by Curve D–8 of FIG. 8. Ordinarily, the increment of $M_W$ used to determine slope is the change in $M_W$ between valve points and the incremental curve so determined is therefore an approximation of the true derivative.

The Incremental Heat Rate does not usually vary materially over extended periods of time but only as changes occur in prime mover heat rate or steam generator efficiency. On the other hand the Incremental Cost can change abruptly and widely. Thus during certain seasons of the year a fuel such as natural gas may be available at "dump" rates, while at other seasons it may be necessary to use a "premium" fuel such as fuel oil or natural gas at a higher rate.

It is apparent that if the Incremental Heat Rate and/or the Incremental Cost simultaneously change by the same amount in all power producing units, it may be said, from a control standpoint, that no change has been made. Such a simultaneous change would occur, for example, by a simultaneous switch of all power producing units from a "dump" to a "premium" fuel. Frequently, however, the prime mover heat rate of one power producing unit only may change, or a "dump" fuel may be used in some power producing units and a "premium" fuel in others.

A change in fuel cost, as will be evident from an inspection of Equation 4 and Curve C–8, changes the slope of the Incremental Cost curve whereas a change in the input (B.t.u.)-output relationship may change the slope, displace the curve up or down, or do both. For these reasons we prefer to first establish a signal proportional to a Base Incremental Heat Rate curve of the power producing unit, and then provide separate means for; (a) biasing the signal up or down, (b) adjusting the rate of change of signal and finally, (c) multiplying the last named signal by a factor proportional to fuel cost, to establish a signal which we term the, "Machine Incremental Cost Signal."

We show in FIG. 4 the thermal converter 100 arranged to produce a D.-C. voltage proportional to the net $M_W$ output of generator 12B. A function generator 101, which may be similar to the type illustrated and described in the previously mentioned application to Harvard H. Gorrie, Serial No. 653,427, filed in the United States Patent Office on April 17, 1957, is arranged to angularly position a cam 102 in proportion to the net $M_W$ output. Cam 102 is shaped to correspond to the Base Incremental Heat Rate curve. This curve is preferably derived from actual tests of the power producing unit under normal conditions, or if such tests cannot be performed from manufacturer's operating data for the components making up the power producing unit. A movable core transformer 103 positioned by the cam 102 produces an A.-C. signal varying over a predetermined range, for example from 0 to 5 volts A.-C., from the minimum to the maximum incremental heat rate of the power producing unit.

We find it desirable to maintain the same range of output signal of the movable core transformer 103 regardless of the basic range in incremental heat rate represented. This makes it possible to standardize the rise of cam 102 and maintain the travel of the core of movable core transformer 103 at optimum value. It is evident, however, that to establish a Machine Incremental Cost Signal which may be compared against the Station Control Signal, it is necessary that the output signal of the function generators on all power producing units be transposed to a common scale so that each actual value of incremental heat rate is represented by a discreet signal value. This common scale is preferably arranged to have zero signal value correspond to zero incremental heat rate, that is, have zero suppression to facilitate modifying the signal in accordance with changes in incremental heat rate.

Appreciating that a specific example may clarify an otherwise abstruse explanation we show in FIG. 9 the Base Incremental Heat Rate curves for three power producing units identified as Unit 1, 2 and 3. As shown Unit No. 1 has a total change in Incremental Heat Rate of 65,000 B.t.u./$M_W$; Unit No. 2 a total change of 40,000 B.t.u./$M_W$; and Unit No. 3 a total change of 34,000 B.t.u./$M_W$. In accordance with the explanation we have made the output signals generated by the function generators 101 for these three units would have the same range of 0–5 volts A.-C.

To bring the output signal generated by function generator 101 to a desired range we provide a demodulator 104 having a gain adjuster 105. Included in the output circuit, which is grounded at 106, is a resistance 107, a potentiometer 108 energized by a source 108A, and equal resistances 109 and 110.

Spanning resistance 107 is a source 107A. It is apparent that by proper selection of the circuit components, the voltage at junction 111, through adjustment of potentiometer 108 and gain adjuster 105 may be made to assume any desired range for the 0–5 volt output of movable core transformer 103. Thus in the illustrative example the potentiometer 108 and gain adjuster 105 would be adjusted so that on Unit 1 the voltage at terminal 111 would vary from +78 to +111; on Unit No. 2 these components would be adjusted so that the voltage at terminal 111 would vary from +72 to +92; and on Unit No. 3 so that the the voltage at terminal 111 would vary from +72 to +89 volts.

Spanning resistances 109 and 110 is a potentiometer 112. When in the mid position, the voltage on contact 113 will be the same as the voltage at junction 111. Adjustment of contact 113 up or down will cause the voltage on contact 113 to differ from that at terminal 111 by an amount proportional to the adjustment. Thus potentiometer 112 may be used to correct the Base Incremental Heat Rate for changes which cause a change in slope.

Voltage at contact 113 is transmitted to a contact 114 of a potentiometer 115 connected across a suitable source of potential 117. Adjustment of contact 114 up or down produces a corresponding change in voltage at the common terminal 118 of resistances 119 and 120 connected in series across source 117. Hence potentiometer 115 provides a means for correcting the Base Incremental Heat Rate Curve for those changes which displace the curve up or down.

With contact 114 in the mid position and with resistances 119 and 120 having equal values the voltage at junction 121 will be equal to the voltage at contact 114 and further with contact 113 also in the mid position the voltage at junction 121 will be equal to the voltage at junction 111. This condition exists when no correction is applied to the Base Incremental Heat Rate. The difference in voltage between junctions 111 and 121 is a measure of the total correction applied through potentiometers 112 and 115, and an indicator 122 responsive to this difference may be graduated to read directly the total correction applied at any time to the Base Incremental Heat Rate.

As hereinbefore explained when all power producing units are utilizing fuel having the same unit cost, fuel cost may be neglected as the relative Incremental Costs will be the same between the power producing units as the relative Incremental Heat Rates. The voltage at 121 may then, after proper suppression, be used directly as the Machine Incremental Cost Signal for comparison against the Station Control Signal. Thus in FIG. 9 we show, as an illustrative example, a case wherein the Machine Incremental Cost, that is, the voltage for comparison with the Station Control Signal has the same change per unit change in Incremental Heat Rate as the change in voltage at terminal 121. In this example the voltage at 121 after being reduced by 60 volts in series suppressor units generally indicated as 122 and 123 may be compared directly against the Station Control Signal in algebraic summing Control Action Unit 13A. A voltage divider circuit may be introduced between terminal 121 and ground 106 which incorporates a resistance 125, such as shown by dashed line, to establish at terminal 126 a Machine Incremental Cost Signal having any desired change per unit change in Incremental Heat Rate. In general we prefer to have the change in Machine Incremental Cost Signal per unit change in Incremental Heat Rate as large as possible to provide maximum sensitivity and reduce, insofar as possible, to negligible value the inherent inaccuracies in the components making up the system.

When fuels of different cost per B.t.u. are used in the power producing units it is necessary to multiply the Incremental Heat Rate by a factor proportional to fuel cost to properly relate the incremental costs of the power producing units. Ordinarily, because of the wide difference in fuel costs, mixed fuel firing, that is, firing of some units with one fuel and other units with another fuel will produce a wide divergence in incremental costs so that the change in Machine Incremental Cost Signal for a unit change in Incremental Heat Rate must be relatively small.

Where such mixed firing must be accounted for a potentiometer 127 may be incorporated in the voltage divider circuit between terminal 121 and ground 106. The potentiometer 127 may be provided with a scale 127A graduated to read directly in terms of unit fuel cost. Under mixed fuel conditions the voltage established by potentiometer 127 is substituted for the voltage at 126 by means of a manually operable switch 128 and is transmitted to the algebraic summing Control Action Unit 13A after proper reduction in suppression unit 123.

The algebraic summing Control Action Unit 13A generates at output terminal 128 an error signal which is transmitted to a reset Control Action Unit 15A and which produces at output terminal 129 a signal proportional to the time integral of the error signal at terminal 128. The signal at 129 is introduced into algebraic summing Control Action Unit 9A. An error signal at terminal 128 will therefore cause a slow continuing readjustment in the output of the power producing unit until the error signal is attenuataed to zero. Under this condition the power producing unit will be operating at the assigned incremental cost.

A limiting circuit generally indicated at 130 and similar to those previously described may be incorporated in the output circuit of Control Action Unit 13A to limit the rate of change of signal into the algebraic summing Control Action Unit 9A. The rate of change in the output signal of Control Action Unit 15A may be further attenuated by means of a grounded adjustable potentiometer 131.

The magnitude of the signal at 129 with respect to ground is a measure of the readjustment which is being demanded at any instant. An indicator 132 may be incorporated in the circuit to give a visual indication of this. Ordinarily when the signal at 129 is effective to readjust the output of the power producing unit the signal at 129 will be at or near zero. However, under some conditions it is desirable to render the signal at 129 ineffective and to substitute therefor by means of switch 18A a manually adjustable signal generated by potentiometer 133 connected across a suitable source 134. A contact 135 operated by switch 18A grounds the input to reset Control Action Unit 15A thereby inhibiting any regenerative action during periods that switch 18A is in the "Hand" position. The signal established by potentiometer 133, when effective, biases the output of the power producing unit up or down by an amount proportional to the magnitude of the signal. Indicator 132 under this condition indicates the magnitude of the bias.

We have stated that one of the objects of our invention is to maintain the output of the power producing unit within predetermined limits, but to permit the output to temporarily go beyond such limits to assist in satisfying temporary changes in load. This we accomplished by permitting the Station Control Signal to immediately adjust the output of the prime mover to assist in satisfying changes in system demand notwithstanding that such adjustment may carry the output above or below predetermined max. and min. limits. When either of such limits exceeded, however, we utilize the algebraic summing Control Action Unit 13A and reset Control Action Unit 15A to produce a regenerative signal which gradually restores the output of the prime mover to the predetermined limit.

In FIG. 4 we show a potentiometer 140 which is angularly positioned relative to ground at contact 141 by function generator 101 and energized by suitable source 142. Also connected across source 142 are manually adjustable potentiometers 143 and 144 for setting the minimum and maximum limits respectively of the power producing unit. Contact 141 is arranged to move upwardly (as shown schematically in the drawing) relative to potentiometer 140 as the output of the power producing unit increases and thus cause a reduction in voltage at contacts 143A and 144A. That is to say the circuit arrangement is such that the voltage of contacts 143A and 144A varies inversely with the output of the prime mover.

When the voltage on contact 144A is reduced to a predetermined value magnetic amplifier relay shown diagrammatically at 145, and which may be of the general type illustrated and described in Hornfeck et al. application Serial No. 786,820 filed in the United States Patent Office on January 14, 1959, now Patent 3,015,768, is triggered to energize solenoid 146. Potentiometer 144 is adjusted to trigger magnetic amplifier relay 145 when the output of the power producing unit increases to a predetermined value. Increases in output beyond this value serve to further decrease the voltage at contact 144A. Solenoid 146 will remain energized so long as the output of the power producing unit remains above the predetermined value.

As the output of the power producing unit decreases the voltage at contact 143A increases and at a predetermined value triggers magnetic amplifier relay 147 to energize solenoid 148. So long as the output of the power producing unit remains below the predetermined value solenoid 148 remains energized. Energization of solenoid 146 or 148 operates contacts 146 or 148 respectively from their normal positions, shown in the drawing, in accordance with established convention, as the position occupied with solenoids 146 and 148 are deenergized. This is the postiion of the contacts when the output of the power producing unit is anywhere between the established minimum and maximum limits.

When contacts 146 are operated by energization of solenoid 146 the voltage at contact 144A through bias unit 149 is substituted in the algebraic summing Control Action Unit 13A for the Station Control Signal; and ground potential is substituted for the Machine Incremental Cost Signal. Similarly when solenoid 148 is energized the voltage at contact 143A, through bias unit 149, is substituted in algebraic summing Control Action Unit 13A for the Station Control Signal and ground potential is substituted for the Machine Incremental Cost Signal.

Bias Unit 149 essentially comprises a first pair of equal resistors 171A and 170B, and a second pair of equal resistors 171A and 171B connected across a source 172. Disposed between resistors 171A and 171B is a potentiometer 150. The purpose of bias unit 149 is to add a small voltage of constant amount to the voltage of contact 144A and to subtract a voltage of the same amount from the voltage of contact 143A. Thus assuming that relays 145 and 147 are arranged to trigger when the voltage at contacts 144A and 143A is zero; it being understood that relay 145 remains triggered at voltages below zero and relay 147 at voltages above zero. In the first place, when relay 145 is triggered and solenoid 146 energized, the bias unit will add to the zero voltage of contact 144A a constant voltage of small amount which for purposes of illustration may be assumed as one volt. This one volt signal is introduced into summing action unit 13A and appears as a voltage of proportional amount at the input to reset Control Action Unit 15A. The signal generated in this unit through Control Action Unit 9A causes the output of the power generating unit to gradually increase until, in the case assumed, the voltage at contact 144A is reduced to minus one volt when the voltage at the output of bias unit 149 will be zero and the voltage output of reset Control Action Unit 129 is stabilized at the then existing value so that the output of the power producing unit remains constant except for changes produced by changes in the Station Control Signal.

Assume now an increase in Station Control Signal producing a further increase in the output of the power producing unit. The voltage of contact 144A will go more negative causing a negative voltage to appear at the output of bias unit 149. Such negative voltage, impressed on reset Control Action Unit 15A will cause a gradual reduction in the output of the power producing unit until the voltage at contact 144A is returned to a minus one volt value and the output of bias unit 149 is zero. If in place of an increase in Station Control Signal, a decrease is assumed, the voltage at contact 144A will increase as prime mover output decreases causing a positive voltage to be introduced into Control Action 9A thereby causing the output of the power producing unit to increase until the output voltage of bias unit 149 is returned to zero. It is evident that the bias unit 149 serves to offset the null point about which the output of the power producing unit is maintained from that which would be maintained if the voltage of contact 144A was transmitted directly to Control Action Unit 13A. This offset serves to eliminate frequent triggering of relay 145 and consequent frequent operation of the contacts of solenoid 146. Potentiometer 150 is provided so that the amount of offset between the output of the bias unit 149 and voltage of contact 143A or 144A may be set at a predetermined value. When the movable contact of potentiometer 150 is in the zero position, that is, when the resistance of the potentiometer is shunted out, the offset will be zero; and when the movable contact is in the max position the offset will be maximum.

The reverse occurs when minimum load is reached, then at a preset voltage, relay 147 will trigger, energizing solenoid 148 to impress the voltage of contact 143A, as offset by bias unit 149, on Control Action Unit 13A. The offset produced by bias unit 149 further decreases the output of the power producing unit until the voltage of contact 143A is sufficiently positive to return the output of the bias unit 149 to zero value. Normal operation of the control is restored whenever the Station Control Signal changes sufficiently to release relay 145 or 147 as the case may be.

Various interlocks and fail-safe devices may be incorporated in our control system to prevent false or incorrect operation. As we have stated, a primary protective feature is easily incorporated by boosting the signal transmitted from the Master Control to the Station Control to be positive with respect to ground and hence loss of signal may be easily detected.

Furthermore, various safety features may then be readily incorporated by having a fault in the control simulate a signal failure. In general any interlocks or fail safe devices we may incorporate act to immediately transfer control of the synchronizing motor 11A to basic "Hand" control and prevent the transfer from "Hand" to "Auto" until the position of the synchronizing motor demanded by the Unit Control Signal corresponds to the actual position thereof.

We show at 151 a relay having a primary coil 152 energized by the incoming voltage signal from the Master Control Station. Normally, that is, with coil 152 deenergized contact 153 is closed. This condition exists in the absence of an incoming voltage signal. With contacts 153 closed relay coil 160 is energized with contacts 160 operated thereby are open. Manually operated switches 154 and 155 then only can be used to raise and lower the output of the power producing unit. When coil 152 is energized by the incoming voltage signal, contact 153 opens deenergizing coil 160 so that the contacts operated thereby are held in a closed position. A reset switch 156 is provided to prevent automatic deenergization of coil 160 and closure of contacts 160 upon restoration of the signal voltage.

To prevent transfer from "Hand" to "Auto" of the synchronizing motor 11A before proper correspondence exists between the position thereof and level of Unit Control Signal a solenoid coil 157 is provided connected between the feedback voltage produced in magnetic amplifier 10A, which is proportional to the position of the synchronizing motor 11A, and the Signal voltage at terminal 87. If these two voltages are approximately equal solenoid 157 is deenergized and the contacts 157 operated thereby, located as shown in the control circuit of synchronizing motor 11A are closed. Upon a predetermined difference between the two voltages solenoid 157 is energized to open contacts 157 operated thereby and throw control of the synchronizing motor to switches 154 and 155. An indicator 158 may be provided to indicate the difference between Signal voltage at terminal 87 and feedback voltage to guide the operator in adjusting the synchronizing motor position and/or Unit control Signal so that transfer from "Hand" to "Auto" may be accomplished.

While we have illustrated and described a specific embodiment of our invention and have made reference to specific voltage ranges, incremental rates etc. it should be understood that our invention is not to be considered as limited thereto but only as defined by the following claims.

What we claim as new and desire to secure by Letters Patent of the United States is:

1. A load control for an electric power system which includes a power producing unit, in combination, a master controller for generating a master control signal corresponding to the desired rate of system power generation, a first means for immediately adjusting the output of the power producing unit in accordance with changes in the master control signal, a second means for producing a machine signal having a functional relationship to the output of the power producing unit and means for gradually readjusting the output of the power producing unit to maintain a predetermined relationship between the master and machine signals.

2. A load control for an electric power system which includes a power producing unit, in combination, a master controller for generating a master control signal corresponding to the desired rate of system power generation, a first means for adjusting the output of the power producing unit in accordance with changes in the master control signal, a second means for producing a machine signal corresponding to the incremental cost of the power producing unit and means for gradually readjusting the output of the power producing unit to maintain a predetermined relationship between the master and machine signals.

3. A load control for an electric power system which includes a power producing unit, in combination, a master controller for generating a master control signal corresponding to the desired rate of system power generation, a first means for adjusting the output of the power producing unit in accordance with changes in the master control signal, a function generator responsive to the power output of the power producing unit for generating a machine signal having a functional relationship to the output of the power producing unit and means for gradually readjusting the output of the power producing unit to maintain a predetermined relationship between the master and machine signals.

4. A load control for an electric power system which includes a power producing unit, in combination, a master controller for generating a master control signal corresponding to the desired rate of system power generation, a first means for adjusting the output of the power producing unit in accordance with changes in the master control signal, a function generator comprising a cam angularly positioned in accordance with a measure of the output of the power producing unit and a differential transformer having elements relatively positioned by said cam to thereby produce a machine signal having a functional relationship to the output of the power producing unit, and means responsive to the difference between the master and machine signals for readjusting the output of the power producing unit at a rate corresponding to the time integral of said difference.

5. A load control for an electric power system which includes a power producing unit, in combination, a master controller for generating a master control signal corresponding to the desired rate of system power generation, a first means responsive to said signal for adjusting the output of the power producing unit in accordance with changes in the master control signal, a function generator comprising a cam angularly positioned in accordance with a measure of the rate of operation of the power producing unit and a differential transformer having elements relatively positioned by said cam to thereby produce a machine signal having a functional relationship to the output of the power producing unit, adjustable means for varying said functional relationship and means responsive to the difference between master and machine signals for readjusting the output of the power producing unit at a rate corresponding to the time integral of said difference.

6. A load control for an electric power system which includes a power producing unit, in combination, a master controller for generating a master control signal corresponding to the desired rate of system power generation, a first means responsive to said signal for adjusting the output of the power producing unit in accordance with changes in the master control signal, means including a function generator comprising a cam angularly positioned in accordance with a measure of the rate of operation of the power producing unit and a differential transformer having elements relatively positioned by said cam to produce a machine signal corresponding to a predetermined incremental cost of the power producing unit, means for adjusting said signal in accordance with changes in the incremental cost and means responsive to the difference between the master and machine signals for readjusting the output of the power producing unit at a rate corresponding to the time integral of said difference.

7. A load control for an electric power system which includes a power producing unit, in combination, a master controller for generating a master control signal corresponding to the desired rate of system power generation, a first means responsive to said master control signal for adjusting the output of the power producing unit in accordance with changes in the master control signal, a function generator comprising a cam angularly positioned in accordance with a measure of the rate of operation of the power producing unit and having a contour corresponding to a predetermined incremental heat rate curve of the power producing unit, means including a differential transformer having elements relatively positioned by said cam to generate a machine signal corresponding to the predetermined incremental heat rate of the power producing unit, means for adjusting said machine signal for changes in the incremental heat rate, means for multiplying said machine signal by a factor corresponding to unit fuel cost and means responsive to the difference between the master and machine signals for readjusting the output of the power producing unit at a rate corresponding to the time integral of said difference.

8. A load control for an electric power system which includes a power station having a power producing unit, in combination, a master controller for generating a master control signal corresponding to the desired rate of system power generation, means for modifying the master control signal in accordance with the incremental transmission losses associated with said power station, a first means for immediately adjusting the output of a power producing unit in accordance with changes in the modified master control signal, and a second means for readjusting the output of the power producing unit following said immediate changes to bring about a predetermined relationship between the output of the power producing unit and a characteristic of the modified master control signal.

9. In a load control system for an electric power system having a plurality of power generating stations, a master controller comprising means for generating a master control signal corresponding to the desired rate of system power generation, a function generator responsive to said master control signal and positioning a plurality of potentiometers in accordance with changes in the magnitude of the master control signal, means for impressing a voltage across each of said potentiometers corresponding to $(1-L_S)$ where $L_S$ is the transmission losses associated with one of said stations to thereby generate a modified master control signal unique for each generating station.

10. A load control system for an electric power system which includes a power producing unit, in combination, means for producing a master control signal proportional to the difference between desired and actual system power generation until the signal reaches a predetermined magnitude and thereafter maintaining the signal constant, means changing the magnitude of the master control signal in accordance with the time integral of the difference between desired and actual system power generation, means for limiting the rate of change in said master control signal produced by said last named means, means for immediately adjusting the output of the power generating unit in accordance with the changes in the master control signal, and means for readjusting the output of the generating unit following such immediate changes to bring about a predetermined relationship between the output thereof and the magnitude of said master control signal.

11. A load control system for an electric power system which includes a power producing unit, in combination, means for producing a master control signal having one polarity when the actual system power generation is greater than that desired and of opposite polarity when the actual system power generation is less than that desired, means for biasing the master control signal to have the same polarity regardless of whether actual system generation is greater than or less than desired system generation, means for restoring the original relationship between the polarity of the master control signal and difference between desired and actual system generation, and means for controlling the output of the power producing unit in accordance with the master control signal after restoration of the original relationship between polarity and the difference between desired and actual system generation.

12. In a control system for a prime mover comprising a steam turbine and an electric generator driven thereby, in combination, means for generating an electric control signal in accordance with the desired power generation of the prime mover, means for generating a second electric signal in accordance with the steam flow to the turbine, means for generating a third electric signal in accordance with the difference between the first and second signals and means under the control of the third electric signal for varying the rate of steam flow to the turbine to maintain the second electric signal equal to the first electric signal.

13. In a control system for a prime mover comprising a steam turbine and an electric generator driven thereby, in combination, valve means controlling the admission of steam to the turbine, a governor for adjusting said valve means, a synchronizing motor for adjusting the loading of said governor, means for generating a master control signal corresponding to the desired rate of power generation of the prime mover, means for generating a control signal corresponding to the rate of steam flow to the turbine and means under the joint control of said signals for causing operation of said synchronizing motor to maintain a predetermined relationship between said signals.

14. In a control system for a prime mover comprising a steam turbine and an electric generator driven thereby, in combination, valve means controlling the admission of steam to the turbine, a governor for adjusting said valve means, a synchronizing motor for adjusting the loading of said governor, a differential transformer having an element positioned by said synchronizing motor and generating a signal in accordance with the position thereof, means for generating a master control signal corresponding to the desired rate of power generation of the prime mover and means controlling the positioning of the synchronizing motor under the joint control of said master control signal and the signal generated by said differential transformer.

15. In a control system for a prime mover comprising a steam turbine and an electric generator driven thereby, in combination, valve means controlling the admission of steam to the turbine, a governor for adjusting said valve means, a synchronizing motor for adjusting the loading of said governor, a differential transformer having elements relatively positioned in accordance with a measure of the actual rate of power generation of the prime mover to generate a signal in accordance with the actual rate of power generation, means for generating a master control signal corresponding to the desired rate of power generation of the prime mover and means controlling the positioning of the synchronizing motor under the joint control of said master control signal and the signal generated by said differential transformer.

16. In a control system for a prime mover comprising a steam turbine and an electric generator driven thereby, in combination, means for generating a master control signal corresponding to the desired rate of power generation of the prime mover, means responsive to said signal for maintaining the output of the prime mover in correspondence therewith, means responsive to generator output for producing a signal corresponding thereto and means operated by the last named signal at a predetermined value for biasing the master control signal to effect continuous adjustment of the output of the generator toward a second predetermined value of generator output.

17. A load control for an electric power system which includes a power producing unit, in combination, a master controller for generating a master control signal corresponding to the desired rate of system power generation, a first means responsive to said signal for adjusting the output of the power producing unit in accordance with changes in the master control signal, a function generator including a cam angularly positioned in accordance with a measure of the rate of operation of the power producing unit and a differential transformer having elements relatively positioned by said cam to thereby produce a machine signal having a functional relationship to the output of the power producing unit, means responsive to the difference between the master and machine signals for readjusting the output of the power producing unit at a rate corresponding to the time integral of said difference, and means operated by said function generator at a predetermined output of the power producing unit for substituting a limit signal having a second functional relationship to the output of the power producing unit for said machine signal.

18. A load control for an electric power system which includes a power producing unit, in combination, a master controller for generating a master control signal corresponding to the desired rate of system generation, a function generator including a cam angularly positioned in accordance with a measure of the rate of operation of the power producing unit and a differential transformer having elements relatively positioned by said cam to thereby produce a machine signal having a first functional relationship to the output of the power producing unit, a first algebraic summing relay responsive to the master control signal and the machine signal for producing a first signal in accordance with the difference between said master and machine signals, a reset relay for generating a second signal proportional to the time integral of the first signal, a second algebraic summing relay for producing a third signal proportional to the difference between the master control signal and the second signal, means responsive to said third signal adjusting the rate of operation of said power producing unit, means operated by said function generator to produce a fourth signal having a second functional relationship to the output of the power producing unit, means for producing a fifth signal corresponding to said fourth signal biased by a predetermined amount, and means operated by said fourth signal at a predetermined value thereof for rendering the first algebraic summing relay unresponsive to the master control signal and said machine signal and rendering said relay responsive to a sixth signal having a constant value and said fifth signal.

19. A load control in accordance with claim 3 wherein means are provided for modifying the master control signal in accordance with the incremental transmission loss associated with said power producing unit.

20. A load control in accordance with claim 19 wherein said means includes a function generator responsive to the master control signal, a potentiometer positioned thereby in accordance with changes in the master control signal and including means for impressing across said potentiometer a voltage corresponding to $(1-L_S)$ where $L_S$ is the transmission loss associated with the power generating unit to thereby generate a modified master control signal.

21. A load control in accordance with claim 3 wherein a first means is provided for preventing the master control signal from exceeding a predetermined value and a second means is provided for limiting the rate of change of the master control signal.

22. A load control in accordance with claim 3 wherein the master control signal has one polarity when the output of the generating unit is greater than that desired and of opposite polarity when the output is less than that desired, and including: means for biasing the master control signal to have the same polarity regardless of whether the output is greater or less than that desired, means for restoring the original relationship between the polarity of the master control signals and the difference between desired and actual generation, and means for controlling the output of the generating unit in accordance with the master control signal after restoration of the original relationship between polarity and the difference between desired and actual generation.

23. A load control in accordance with claim 3 wherein the power producing unit comprises a steam turbine and an electric generator driven thereby and including: means for generating a first signal in accordance with the steam flow to the turbine, means for generating a second signal in accordance with the difference between the master and first signals; and means under the control of the second signal for varying the rate of steam flow to the turbine to maintain the first signal equal to the master signal.

24. A load control in accordance with claim 23 wherein the last means includes a valve means controlling the admission of steam to the turbine, a governor for adjusting the valve means, a synchronizing motor for adjusting the loading of the governor, and said second signal causes operation of the synchronizing motor.

25. A load control in accordance with claim 3 wherein the power producing unit comprises a steam turbine and an electric generator driven thereby and including: valve means controlling admission of steam to the turbine, a governor for adjusting said valve means, a synchronizing motor for adjusting the loading of the governor, a differential transformer having an element positioned by the synchronizing motor and generating a signal in accordance with the position thereof, and the positioning of the synchronizing motor is under the joint control of the master control signal and the signal generated by the differential transformer.

26. A load control in accordance with claim 3 including means responsive to the output of the power producing unit for producing a signal corresponding thereto and means operated by the last named signal at a predetermined value for biasing the master control signal to effect continuous adjustment of the output of the power producing unit toward a second predetermined value.

27. A load control for an electric power system which includes a power producing unit, in combination, a master controller for generating a master control signal corresponding to the desired rate of system power generation, a first means for immediately adjusting the output of the power producing unit in accordance with changes in the master control signal, a second means including a differential transformer having relatively movable elements for producing a second signal corresponding to the difference between the actual and desired incremental cost of power production of said power producing unit, and means responsive to said second signal for readjusting the output of the power producing unit in a direction tending to maintain the actual incremental cost of power production of said power producing unit equal to the desired system incremental cost of power production.

28. A load control for an electric power system which includes a power producing unit, in combination, a master controller for generating a master control signal corresponding to the desired rate of system power generation, a first means for adjusting the output of the power producing unit in accordance with changes in the master control signal, a second means including a function generator comprising a cam and a differential transformer having elements relatively positioned by said cam for producing a second signal corresponding to the difference between the actual and desired incremental cost of power production of said power producing unit, means responsive to said second signal for readjusting the output of the power producing unit in a direction tending to maintain the actual incremental cost of power production of said power producing unit equal to the desired system incremental cost of power production.

References Cited in the file of this patent

UNITED STATES PATENTS

| | | |
|---|---|---|
| 2,836,730 | Early | May 27, 1958 |
| 2,878,397 | Foster | Mar. 17, 1959 |
| 2,962,598 | Larew et al. | Nov. 29, 1960 |